(12) United States Patent
Jonsson et al.

(10) Patent No.: US 7,341,409 B2
(45) Date of Patent: Mar. 11, 2008

(54) TOOL FOR CHIP REMOVING MACHINING

(75) Inventors: Christer Jonsson, Hedemora (SE); Bengt Högrelius, Fagersta (SE); Jan Eriksson, Fagersta (SE); Christer Ejderklint, Fagersta (SE); Carl-Erik Berglöw, Fagersta (SE); Jorma Koskinen, Fagersta (SE); Jonas Boman, Falun (SE)

(73) Assignee: Seco Tools AB, Fagersta (SE)

( * ) Notice: Subject to any disclaimer, the term of this patent is extended or adjusted under 35 U.S.C. 154(b) by 349 days.

(21) Appl. No.: 11/162,632

(22) Filed: Sep. 16, 2005

(65) Prior Publication Data

US 2006/0073744 A1  Apr. 6, 2006

(30) Foreign Application Priority Data

Sep. 24, 2004  (SE) .................................... 0402325

(51) Int. Cl.
 *B23B 51/00* (2006.01)
(52) U.S. Cl. .................. 408/233; 408/239 R; 408/238; 407/30; 407/53
(58) Field of Classification Search ............... 407/30, 407/33, 34, 42, 46, 53, 54, 118, 113; 408/226, 408/233, 231, 238, 239 R; *B23B 51/02*
See application file for complete search history.

(56) References Cited

U.S. PATENT DOCUMENTS

| | | | |
|---|---|---|---|
| 1,407,335 A | | 2/1922 | Reynolds |
| 2,328,602 A | | 9/1943 | Bechler |
| 4,735,537 A | | 4/1988 | Rath |
| 5,114,286 A | | 5/1992 | Calkins |
| 5,496,137 A | * | 3/1996 | Ochayon et al. ............. 408/226 |
| 5,598,751 A | * | 2/1997 | Ochayon et al. ............ 76/108.6 |
| 5,899,642 A | | 5/1999 | Berglow et al. |
| 5,971,670 A | | 10/1999 | Pantzar et al. |
| 6,273,650 B1 | | 8/2001 | Jordberg |
| 6,394,711 B1 | * | 5/2002 | Brosius ........................ 408/57 |
| 6,485,220 B2 | | 11/2002 | Hecht |
| 6,565,291 B2 | | 5/2003 | Harpaz et al. |
| 6,637,985 B2 | | 10/2003 | Pokolm |
| 7,004,692 B2 | * | 2/2006 | Hecht ........................ 408/233 |
| 2001/0041089 A1 | | 11/2001 | Hecht |
| 2002/0021945 A1 | | 2/2002 | Harpaz et al. |
| 2004/0022594 A1 | * | 2/2004 | Hecht ......................... 408/231 |
| 2006/0062642 A1 | * | 3/2006 | Jonsson et al. ............. 408/233 |

FOREIGN PATENT DOCUMENTS

| | | |
|---|---|---|
| DE | 102 05 635 A1 | 8/2003 |
| DE | 10205635 | 8/2003 |
| GB | 2265849 A | 10/1993 |

OTHER PUBLICATIONS

Swedish Official Action in SE 0402325-5 (and English translation).
International Search Report for corresponding PCT/SE2005/001360.

* cited by examiner

*Primary Examiner*—Monica Carter
*Assistant Examiner*—Sara Addisu
(74) *Attorney, Agent, or Firm*—WRB-IP LLP

(57) ABSTRACT

The present invention relates to a tool and a male part for chip removing machining. The tool includes a male part and a holder for the male part. The male part includes a radial and axial supporting and positioning portion and a threaded portion. A largest diameter of the externally threaded portion is smaller than a smallest diameter of the radially and axially supporting and positioning portion. A transition portion is disposed along the axis of the male part between a radially largest portion of the radially and axially supporting and positioning portion and the externally threaded portion.

23 Claims, 3 Drawing Sheets

TOOL FOR CHIP REMOVING MACHINING

The present invention relates to a tool for chip removing machining with a male part and a holder for the tool and, more particularly, to a tool wherein the joint between the male part and the holder includes a transition portion between a large and a small diameter portion of the male part.

Tools with replaceable male parts attached to reusable shafts are used in various applications such as end mills as shown in U.S. Pat. No. 5,971,670. The male part may be formed of a material with a high hardness, such as cemented carbide, while the shaft may be formed of a material that is more easily machined, such as steel. The male part may have an external thread and the holder may have an internal thread for securing the male part to the holder.

The male part can have a working portion, such as a cutting edge. It is often desirable to precisely locate the working portion relative to the shaft, such as during automated machining operations. Axial movement of the male part relative to the holder is typically limited by providing radially extending abutment surfaces on the male part and the holder. U.S. Pat. No. 5,598,751 discloses a tool including a cutting insert that is prevented from moving axially past a particular point along the axis of a tool holder by a base of an externally threaded portion of the insert abutting against the bottom of an internally threaded portion of the tool holder. U.S. Pat. No. 6,485,220 discloses a tool including a cutting insert that is prevented from moving axially past a particular point along the axis of a tool holder by causing an annular shoulder of the insert to abut an annular shoulder of the holder. Radial movement of the insert relative to the holder is typically restrained by the external and internal threads or by straight cylindrical or frustoconical radial supporting and positioning surfaces. Ordinarily, the external threads have substantially the same diameter as a narrowest portion of any discrete radial supporting and positioning surface.

In accordance with an aspect of the invention, a male part of a tool includes a radially and axially supporting and positioning portion disposed at a first location along an axis of the male part of the tool for radially and axially supporting and positioning the male part of the tool at a front end of a holder. The male part also includes an externally threaded portion disposed at a second location along the axis of the male part of the tool for engaging an internally threaded portion of the holder, a largest diameter of the externally threaded portion being smaller than a smallest diameter of the radially and axially supporting and positioning portion. The male part also includes a transition portion disposed along the axis of the male part of the tool between a radially largest portion of the radially and axially supporting and positioning portion and the externally threaded portion.

In accordance with another aspect of the present invention, a tool includes a replaceable male part and a holder to which the male part is adapted to be replaceably mounted. The male part includes a radially and axially supporting and positioning portion disposed at a first location along an axis of the tool for radially and axially supporting and positioning the male part at a front end of the holder, an externally threaded portion disposed at a second location along the axis of the male part for engaging an internally threaded portion of the holder, a largest diameter of the externally threaded portion being smaller than a smallest diameter of the radially and axially supporting and positioning portion, and a transition portion disposed along the axis of the male part between a radially largest portion of the radially and axially supporting and positioning portion and the externally threaded portion. The holder includes an axially extending opening along which extend the internally threaded portion, at least one abutment surface for abutting at least an axially supporting and positioning portion of the radially and axially supporting and positioning portion, and between the internally threaded portion and the at least one abutment surface, a relieved portion, the transition portion of the male part being disposed proximate and spaced from the relieved portion when the male part is mounted at the front end of the holder.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
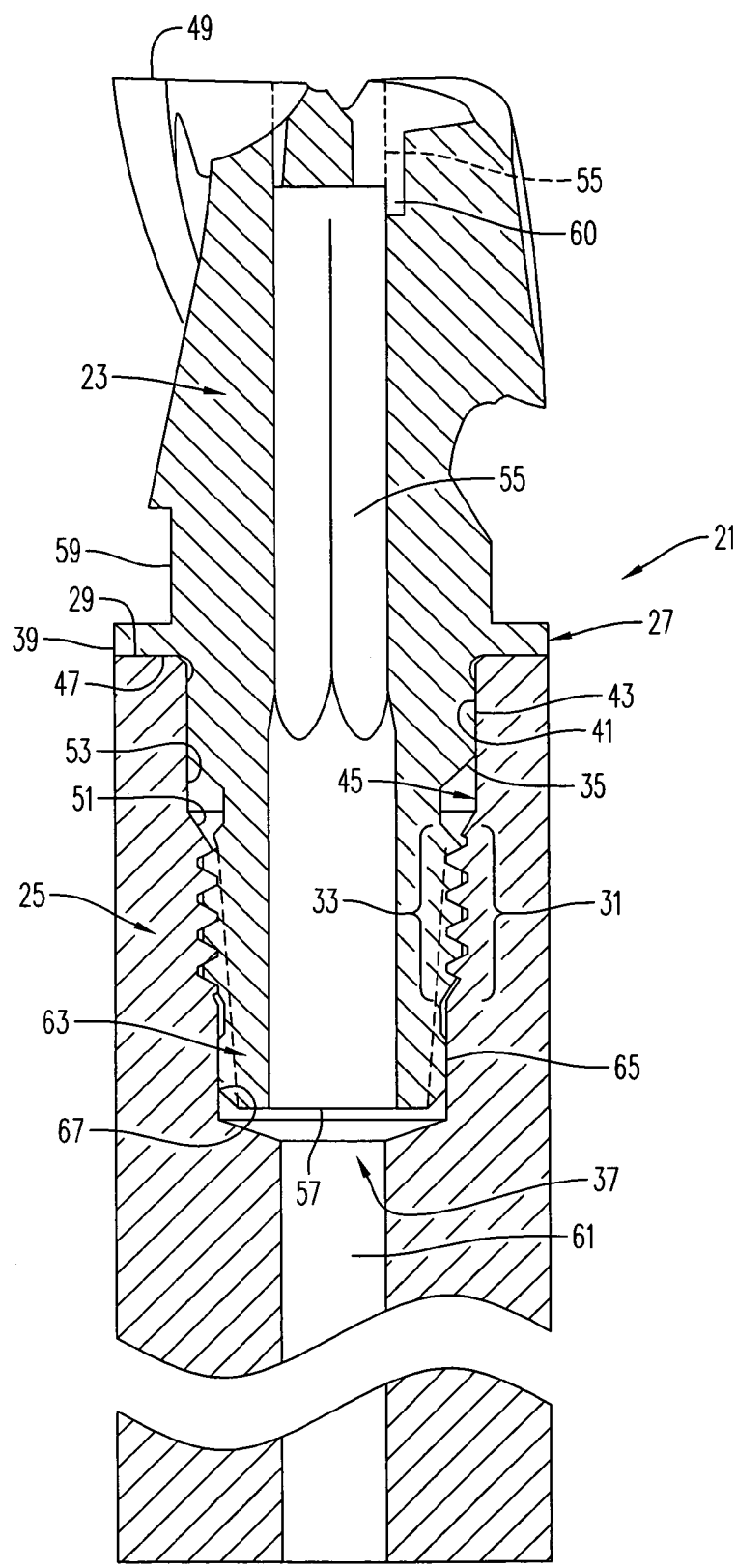
FIG. 1 is a side, cross-sectional view of a tool according to an embodiment of the present invention.
Figure 2:
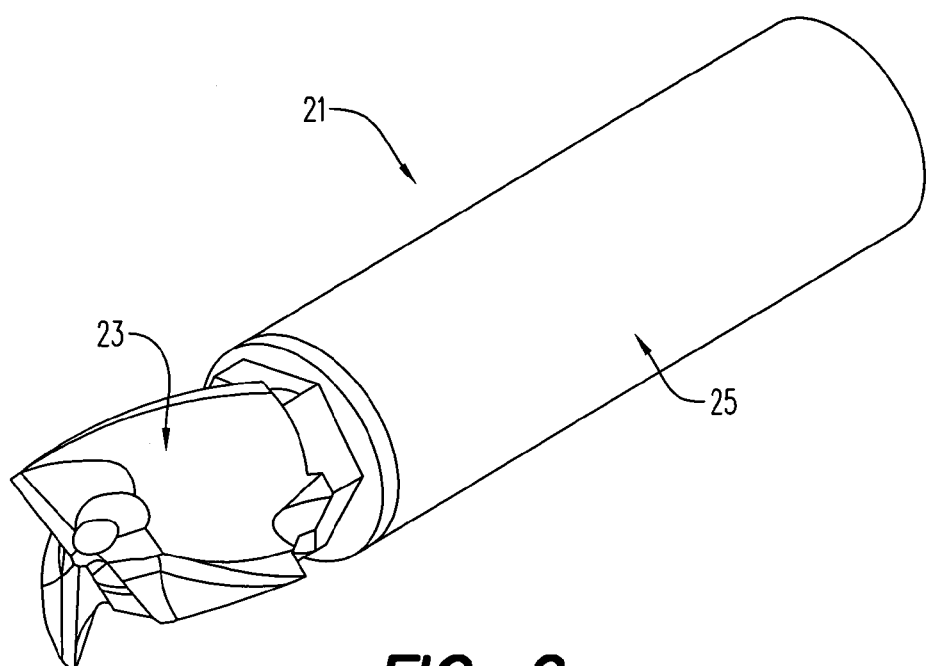
FIG. 2 is a perspective view of a tool according to an embodiment of the present invention.

An embodiment of a tool 21 is shown in FIG. 1 and includes a replaceable male part 23 and a holder 25 to which the male part is adapted to be replaceably mounted. The tool 21 is seen in perspective in FIG. 2. In all of the embodiments of the present invention, the male part can be a replaceable tool such as a cutting tool made from a hard material such as a cemented carbide, while the holder can be a more easily machined material, such as steel.

The male part 23 includes a radially and axially supporting and positioning portion 27 disposed at a first location along an axis of the tool 21 for radially and axially supporting and positioning the male part at a front end 29 of the holder 25. An externally threaded portion 31 is disposed at a second location along the axis of the male part 23 for engaging an internally threaded portion 33 of the holder 25.

For various reasons, it has been determined to be desirable to provide a tool having a male part 23 with an external thread 31 with a diameter that is less than a diameter of the male part at a radially supporting and positioning portion or abutment surface 43 for limiting radial movement. For example, it may be useful to provide more material on the holder 25 made of relatively softer material surrounding the external thread of the relatively harder male part by making the externally threaded portion have a smaller diameter than at the abutment surface for limiting radial movement. Also, providing a threaded portion with a reduced diameter may enable the holder 25 to be provided with a smaller diameter than might otherwise be necessary.

To facilitate insertion of the threaded portion 31 of the male part 23 into the internally threaded portion 33 of the holder 25, a radially largest part of the externally threaded portion is smaller than a radially smallest part of the radially and axially supporting and positioning portion 27. A transition portion 35 is disposed along the axis of the male part 23 and effects at least part of a transition in diameter between a radially largest portion 39 of the radially and axially supporting and positioning portion 27 and the externally threaded portion 31. In the embodiment of FIG. 1, the transition portion 35 is also disposed between the radially smallest portion of the radially and axially supporting and positioning portion 27, specifically, the radially smallest portion of a radially supporting and positioning portion 43, and the externally threaded portion 31.

In tools of the type having a male part and a reusable holder, it often occurs that the male part breaks off in the reusable holder. The holder, of course, cannot be reused until the male part is completely removed. The transition portion 35 is defined here as a portion that extends for a sufficient distance along the axis of the male part to permit a gradual transition in diameter between the radially largest portion 39 of the radially and axially supporting and positioning portion 27 and the externally threaded portion 31 which, inter alia, permits avoidance of abrupt or sharp changes in diameter where failures often occur. A transition portion 35 of the type discussed in the present invention thus ordinarily extends along the axis of the male part 23 for a non-trivial distance. What is meant by a non-trivial distance is dependent upon and varies directly with the size of the male part.

The holder 25 includes an axially extending opening 37 along which extend the internally threaded portion 33, at least one abutment surface 41 for abutting at least a radially supporting and positioning portion 43 of the radially and axially supporting and positioning portion 27, and, between the internally threaded portion and the at least one abutment surface, a relieved portion 45. Because the relieved portion 45 is provided, it is not necessary to form, such as by machining, the entire opening 37 of the holder 25 between the internally threaded portion 33 and the front end 29 of the holder with the same high degree of accuracy to which it is desirable to form the at least one abutment surface 41. It is desirable to form the at least one abutment surface 41 with a high degree of accuracy because the dimensions and location of the at least one abutment surface are significant factors in determining the position of, for example, a cutting portion 49 at a working end of the male part 23.

In the embodiment shown in FIG. 1, the transition portion 35 of the male part 23 is disposed proximate and spaced from the relieved portion 45 when the male part is mounted at the front end 29 of the holder. In this embodiment, the radially and axially supporting and positioning portion 27 includes a radially extending axial supporting and positioning surface 47 and an axially extending radial supporting and positioning surface 43.

Figure 3:
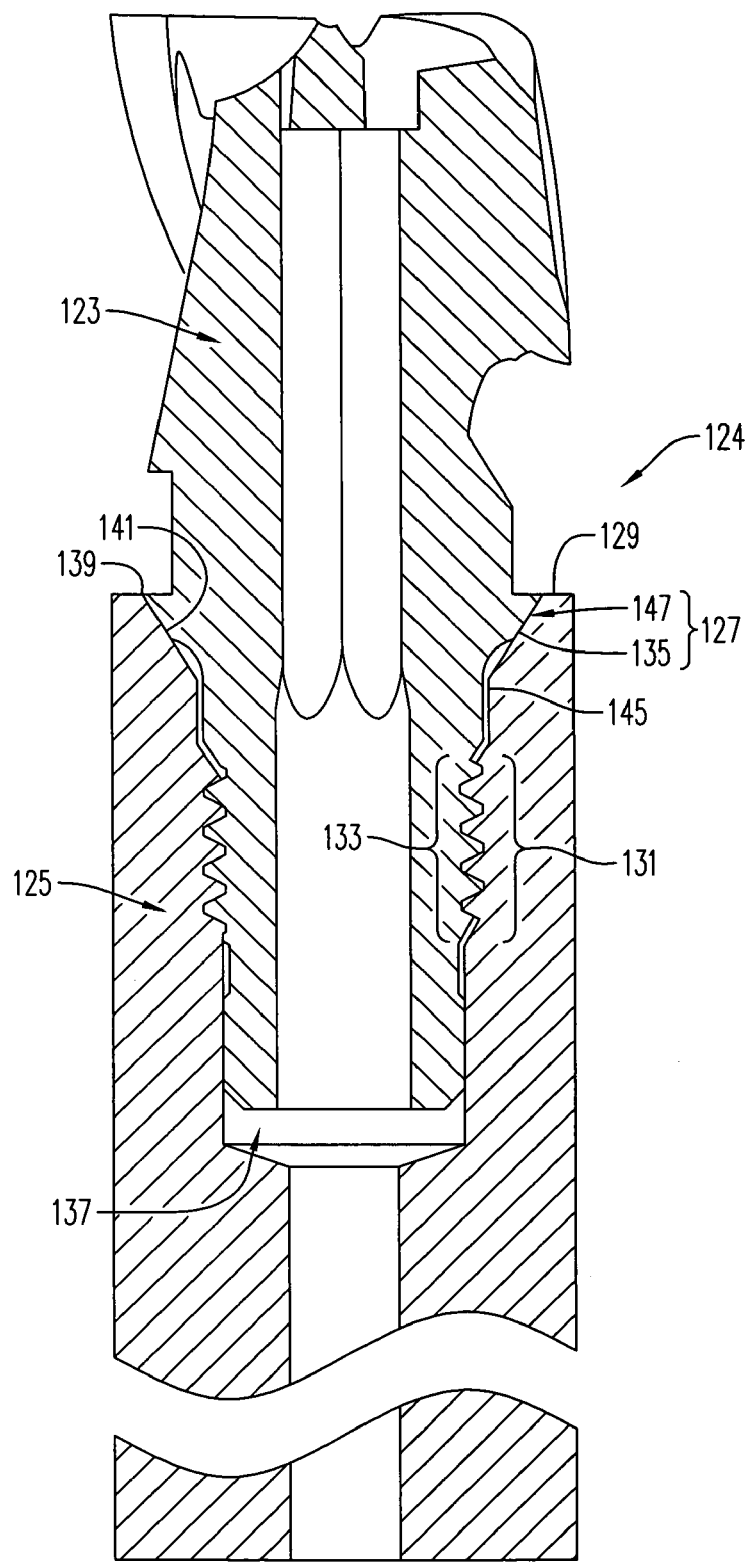
FIG. 3 is a side, cross-sectional view of a tool according to another embodiment of the present invention.

Another embodiment of a tool 121 is shown in FIG. 3 and includes a replaceable male part 123 and a holder 125 to which the male part is adapted to be replaceably mounted. The male part 123 includes a radially and axially supporting and positioning portion 127 disposed at a first location along an axis of the tool 121 for radially and axially supporting and positioning the male part at a front end 129 of the holder 125. An externally threaded portion 131 is disposed at a second location along the axis of the male part 123 for engaging an internally threaded portion 133 of the holder 125.

To facilitate insertion of the threaded portion 131 of the male part 123 into the internally threaded portion 133 of the holder 125, a radially largest part of the externally threaded portion is smaller than a radially smallest part of the radially and axially supporting and positioning portion 127. A transition portion 135 is disposed along the axis of the male part 123 and effects at least part of a transition in diameter between a radially largest portion 139 of the radially and axially supporting and positioning portion 127 and the externally threaded portion 131. The transition portion 135 is defined here as a portion that extends for a sufficient distance along the axis of the male part to permit a gradual transition in diameter between the radially largest portion of the radially and axially supporting and positioning portion 127 and the externally threaded portion 131 which, inter alia, permits avoidance of abrupt or sharp changes in diameter where failures often occur. A transition portion 135 ordinarily extends along the axis of the male part 123 for a non-trivial distance. What is meant by a non-trivial distance is dependent upon and varies directly with the size of the male part.

The holder 125 includes an axially extending opening 137 along which extend the internally threaded portion 133, at least one abutment surface 141 for abutting the radially and axially supporting and positioning portion 127, and, between the internally threaded portion and the at least one abutment surface, a relieved portion 145.

In the embodiment shown in FIG. 3, the radially and axially supporting and positioning portion 127 includes a frustoconical supporting surface 147, at least part of which is the transition portion 135. The frustoconical supporting surface 147 can form some or all of the radially and axially supporting and positioning portion 127. The transition portion 135 can form some or all of the frustoconical supporting surface 147. In such a case, the frustoconical supporting surface 147 and the transition portion 135 have the same cone angle. Of course, if desired, the transition portion 135 can be discrete from the radially and axially supporting and positioning portion 127 in, for example, a manner similar to the manner in which the transition portion 35 is discrete from the radially and axially supporting and positioning portion 27 shown in FIG. 1. The cone angle of the abutment surface 141 and the frustoconical supporting surface 147 is selected to be sufficiently large so that the male part 123 cannot move axially past a predetermined location relative to the holder 125 because of the abutment of the surfaces 147 and 141.

Except where otherwise noted, features of the invention will hereinafter be described in terms of the embodiment of FIG. 1, it being understood that the description pertains as well to the embodiment of FIG. 3. As seen in FIG. 1, the relieved portion 45 can include a transition portion 51 (which may be frustoconical) and an axially extending portion 53. The transition portion 51 will ordinarily extend between any axially extending portion 53 and the internally threaded portion 33 of the holder 25.

The male part 23 can include a non-circular opening 55 extending along the axis of the male part from a rear end 57 of the male part further from the radially and axially supporting and positioning portion 27 than from the externally threaded portion 31 to a position at least proximate the radially and axially supporting and positioning portion. The male part 23 ordinarily also includes an external bearing surface 59 remote from any working area such as a cutting edge 49. The bearing surface 59 can be, for example, a hexagonal surface upon which a wrench can be placed to tightly secure the male part 23 relative to the holder 25.

Figure 4:
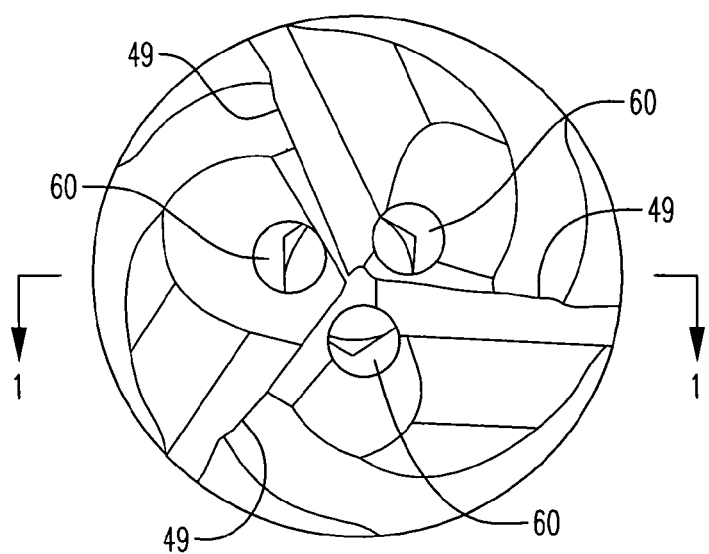
FIG. 4 is an end view of the tool of FIG. 1.

The non-circular opening 55 may also be useful in securing the male part 23 relative to the holder 25 and in removing the male part from the holder. If desired, the non-circular opening 55 can extend along an entire length of the male part 23 and it is desirable that the non-circular opening extends at least to a region proximate the bearing surface 59. Thus, in the event of breakage of the male part 23 at a point between the bearing surface 59 and the rear end 57 of the male part, the non-circular opening 55 can be useful to permit an operator to remove the male part by positioning a suitable non-circular tool in the non-circular opening 55 to remove the remaining portion of the male part 23. For example, when the non-circular opening 55 is hexagonal, a hex wrench can be used to remove the remaining portion of the male part. As seen in FIGS. 1 and 4, the non-circular opening 55 can stop at a point proximate the cutting edge 49 and additional openings 60 can be provided to extend to an exterior of the male part 23 from the non-circular opening. The additional openings 60 can be used to provide, e.g., lubricant or coolant to the cutting edge 49 and a workpiece.

The holder 25 can also include an opening 61 that permits access to the rear end 57 of the male part 23. A non-circular tool can thus be inserted into the non-circular opening 55 of the male part 23 through the opening 61 in the holder 25 in the event that it is desirable to install or remove the male part in a manner other than by using the bearing surface 59 (which may, for example, be omitted).

The male part 23 can include a supplemental radially supporting portion 63 disposed along the axis of the male part at an opposite end of the threaded portion 31 than the transition portion 35. The radially supporting portion 63 can include an axially extending surface 65 that is arranged to fit inside a corresponding opening 67 in the holder and provide additional radial support and stability for the male portion 23.

The externally threaded portion 31 and the internally threaded portion 33 can have substantially constant diameters over their length as shown in FIG. 1. However, as shown by dotted lines, the externally threaded portion and the internally threaded portion can be conical in shape, such as by having a decreasing diameter in a direction along the axis away from the transition portion. The conical shape to the threaded portions can facilitate somewhat quicker mounting of a male portion 23 to the holder, although conically-shaped internally and externally threaded portions may be more difficult to form than straight threaded portions.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A one-piece male part of a tool, comprising:
a radially and axially supporting and positioning portion disposed at a first location along an axis of the male part of the tool for radially and axially supporting and positioning the male part of the tool at a front end of a holder, and an externally threaded portion disposed at a second location along the axis of the male part of the tool for engaging an internally threaded portion of the holder,
wherein a largest diameter of the externally threaded portion is smaller than a smallest diameter of the radially and axially supporting and positioning portion, and a transition portion is disposed along the axis of the male part of the tool between a radially largest portion of the radially and axially supporting and positioning portion and the externally threaded portion, and the transition portion extends radially for a distance greater than a radial height of threads of the externally threaded portion.

2. The male part of the tool as set forth in claim 1, wherein the radially and axially supporting and positioning portion includes a radially extending surface and an axially extending surface.

3. The male part of the tool as set forth in claim 1, wherein the radially and axially supporting and positioning portion includes a frustoconical supporting surface.

4. The male part of the tool as set forth in claim 3, wherein the transition portion forms at least part of the frustoconical supporting surface.

5. The male part of the tool as set forth in claim 4, wherein the frustoconical supporting surface and the transition portion have the same cone angle.

6. The male part of the tool as set forth in claim 3, wherein the frustoconical supporting surface and the transition portion have the same cone angle.

7. The male part of the tool as set forth in claim 1, further comprising a radially supporting portion disposed along the axis of the male part of the tool at an opposite end of the threaded portion than the transition portion.

8. The male part of the tool as set forth in claim 7, wherein the radially supporting portion includes an axially extending surface.

9. The male part of the tool as set forth in claim 1, wherein the threaded portion has a substantially constant diameter over its length.

10. The male part of the tool as set forth in claim 1, wherein the threaded portion has a decreasing diameter in a direction along the axis away from the transitional portion.

11. The male part of the tool as set forth in claim 1, further comprising a working end portion disposed along the axis of the male part of the tool at an opposite end of the radially and axially supporting portion from the transitional portion.

12. The male part of the tool as set forth in claim 1, further comprising a non-circular opening extending along the axis of the male part of the tool from an end of the male part of the tool further from the radially and axially supporting portion than from the externally threaded portion to a position at least proximate the radially and axially supporting portion.

13. The male part of the tool as set forth in claim 12, wherein the non-circular opening extends along the axis of the male part of the tool over an entire length of the male part of the tool.

14. The male part of the tool as set forth in claim 12, wherein the non-circular opening is hexagonal.

15. A tool, comprising:
a replaceable, one piece, male part and a holder to which the male part is adapted to be replaceably mounted, the male part comprising a radially and axially supporting and positioning portion disposed at a first location along an axis of the tool for radially and axially supporting and positioning the male part at a front end of the holder, an externally threaded portion disposed at a second location along the axis of the male part for engaging an internally threaded portion of the holder, wherein a largest diameter of the externally threaded portion is smaller than a smallest diameter of the radially and axially supporting and positioning portion, and wherein a transition portion is disposed along the axis of the male part between a radially largest portion of the radially and axially supporting and positioning portion and the externally threaded portion and the transition portion extends radially for a distance greater than a radial height of threads of the externally threaded portion; and wherein the holder includes an axially extending opening along which extend the internally threaded portion, at least one abutment surface for abutting at least an axially supporting and positioning portion of the radially and axially supporting and positioning portion, and between the internally threaded portion and the at least one abutment surface, a relieved portion, the transition portion of the male part being disposed proximate and spaced from the relieved portion when the male part is mounted at the front end of the holder.

16. The tool as set forth in claim 15, wherein the radially and axially supporting portion includes a radially extending surface and an axially extending surface.

17. The tool as set forth in claim 15, wherein the radially and axially supporting portion includes a frustoconical supporting surface.

18. The tool as set forth in claim 17, wherein the transition portion forms at least part of the frustoconical supporting surface.

19. The tool as set forth in claim 18, wherein the frustoconical supporting surface and the transition portion have the same cone angle.

20. The tool as set forth in claim 15, wherein the relieved portion includes a frustoconical portion.

21. The tool as set forth in claim 20, wherein the relieved portion includes an axially extending portion.

22. The tool as set forth in claim 15, further comprising a non-circular opening extending along the axis of the male part from an end of the male part further from the radially and axially supporting portion than from the externally threaded portion to a position at least proximate the radially and axially supporting portion.

23. The tool as set forth in claim 22, wherein the non-circular opening extends along the axis of the male part over an entire length of the male part.

* * * * *